United States Patent Office 3,079,306
Patented Feb. 26, 1963

3,079,306
PROCESS FOR THE PRODUCTION OF 6-ACYL-AMINOPENICILLANIC ACIDS
Hans Albert Offe, Wuppertal-Elberfeld, Wilfried Kaufmann, Wuppertal-Vohwinkel, and Klaus Bauer, Wuppertal-Elberfeld, Germany, assignors to Farbenfabriken Bayer Aktiengesellschaft, Leverkusen, Germany, a corporation of Germany.
No Drawing. Filed Nov. 29, 1960, Ser. No. 72,311
Claims priority, application Germany Dec. 4, 1959
12 Claims. (Cl. 195—36)

It has been disclosed, heretofore (copending United States application Serial No. 22,086, filed April 14, 1960, by Wilfried Kaufmann et al., which is entitled "Biochemical Process"), that certain so-called "penicillin-splitting" bacteria, that is, bacteria capable of enzymatically hydrolyzing penicillins to 6-aminopenicillanic acid and phenylacetic acid, are useful, under controlled conditions, in the biosyntheses of penicillins. A screening technique for determining operative penicillin-splitting bacteria has been described in detail in the aforementioned copending application, but, for general purposes, it may be said that these include all bacteria capable of inactivating penicillin G by at least 20 percent within 24 hours to yield a solution in which said inactivated penicillin G can be at least partially reactivated or resynthesized by the addition of phenylacetyl chloride thereto.

In our copending U.S. application Serial No. 54,837, filed September 9, 1960, and entitled, "Process for the Enzymatic Acylation of 6-Aminopenicillanic Acid," we have further described and claimed a process for the production of 6-acylaminopenicillanic acids in which the aforementioned penicillin-splitting bacteria or extracts obtained therefrom, and enzymes and enriched enzymes, all capable of preferentially attacking the amide bond in the 6-position of the penicillin molecule with the formation of 6-aminopenicillanic acid, are reacted under conditions of controlled pH with 6-aminopenicillanic acid and a carboxylic acid derivative containing an acyl radical of the general formula:

$$R-(X)_n-CH_2-CO-$$

wherein R is a member selected from the group consisting of lower alkyl radicals containing from 1 to 7 carbon atoms, and phenyl radicals; X is a member selected from the group consisting of oxygen and sulfur; and $n$ is an integer of from 0 to 1, inclusive; whereby the stated bacterial cells function to link the 6-amino group of the 6-aminopenicillanic acid with the acyl radical of the acid to yield novel 6-acylaminopenicillanic acid derivatives, i.e., compounds having the constitution of penicillins. As further disclosed in said copending application, acyl glycocolls or acyl glutamic acids, among others, are particularly suitable carboxylic acid derivatives for use in this synthesis.

The present invention is based on our discovery that at least some 6-acylaminopenicillanic acids can be obtained in substantially higher yields by reacting 6-aminopenicillanic acid with carboxylic acid esters of the foregoing general formulation and particularly hydroxy or mercapto compounds, especially hydroxy- and mercapto-carboxylic acids or their derivatives, in the presence of bacteria or extracts obtained therefrom, enzymes or enzyme enrichments of the general class described above which are capable of linking phenylacetic acid amide-like with the amino group of 6-aminopenicillanic acid.

Illustrative of the 6-aminopenicillanic acid starting compound used in the synthesis of our invention, one may employ the crystallized substance obtained either by synthesis or by decomposition, or, alternatively, enriched crude solutions of the acid such as those obtained from fermentations or from other known processes may be employed to advantage.

The hydroxy and mercapto compounds which are useful in the process of the invention include alcohols, mercaptans, phenols and thiophenols. Specific examples of operative alcohols are ethanol, butanol, dodecyl alcohol, cyclohexanol, phenylmethyl carbinol and glycolic acid. Suitable mercaptans include mercaptobenzthiazol, thioglycolic acid, 2-mercapto-butyric acid and crysteamine. Typical phenols or thiophenols of use in the process include phenol, p-hydroxybenzoic acid, thiophenol and thiocresol.

Typical compounds for use in the practice of the process of the invention include phenylacetic acid thiophenol ester; phenoxyacetic acid methyl ester; α-phenoxypropionylthioglycolic acid; o-chlorophenoxyacetylthioglycolic acid amide, and the p-chlorophenoxyacetyl-thioglycolic acid sodium salt. Especially suitable are the carboxylic acid esters of alcohols and mercaptans which carry themselves carboxyl substituents as, for example, carboxylic acid esters of glycolic or thioglycolic acids.

Significantly, the presence in the reaction mixture of the above-defined bacterial or enzyme masses is essential to the process, since the carboxylic acid esters of the class defined are alone not capable within an aqueous medium at a pH of from 4–8 to acylate 6-aminopenicillanic acid to yield the desired 6-acyl derivatives. Thus, control experiments have shown, for example, that α-phenoxypropionyl-thioglycolic acid when treated at a pH of from 4–8 with 6-aminopenicillanic acid, does not yield α-phenoxypropionyl-6-aminopenicillanic acid, whereas the addition of the requisite enzyme solution promotes the desired synthesis rapidly and with high yields of the aforesaid end-product.

In actual practice of the process of the invention it is not necessary to isolate the biosynthesis-promoting enzymes, but bacterial cells containing the operative enzymes or their lysates are in and of themselves useful agents in effecting the acylation reaction.

It is also significant to note that whereas the process of the invention is capable of producing, in high yields, 6-acylaminopenicillanic acids possessing the valuable antibiotic properties of penicillins, fermentation procedures with penicillin-forming fungi in the presence of the corresponding carboxylic acids (so-called precursors) fail to produce such results.

It is believed that the foregoing principles and procedures of the invention may be best understood by reference to the following specific examples which illustrate the application of at least some of the following typical carboxylic acid esters to the basic biosynthetic reaction mechanism of our invention:

α-Phenoxypropionylthioglycolic acid;
o-Chlorophenoxyacetylthioglycolic acid;
p-Methoxyphenoxyacetylthioglycolic acid;
2,6-dichlorophenoxyacetylthioglycolic acid;
p-Nitrophenoxyacetylthioglycolic acid;
o-Chlorophenoxyacetic acid phenylester;
o-Chlorophenoxyacetylglycolic acid;
α-Phenoxypropionyl-β-thiopropionic acid;
Diphenoxyacetylglycolic acid;
α-Phenoxypropionylthioglycolic acid; and
o-Chlorophenoxyacetylthioglycolic acid amide.

Example 1

160 litres of a 2% by volume solution of corn steep liquor containing 0.2% of potassium phenyl acetate are adjusted to pH 7.0 by means of a potassium hydroxide solution and heated at 120° C. for 30 minutes. After cooling, the solution is clarified by centrifuging and sterilised at 110° C. in a fermentation vessel for 40 minutes.

After cooling, this nutrient solution is inoculated with 400 cc. of an 18 hours' shake culture of *E. coli* ATCC 11105. The batch is then stirred with 150 litres of air per minute at 150 r.p.m. of the stirrer and cultivated at 31° C. without pressure for 17 hours. During the whole growth period 5 litres of carbon dioxide per minute are introduced into the culture through a feed which is separated from the air feed of the fermenter. The bacterial cells are centrifuged off from the culture solution, washed with 16 litres of a 1/15 m. phosphate buffer solution at pH 6.0 and, after centrifuging, re-suspended in a 1/15 m. phosphate buffer solution of pH 6 to form a thick suspension.

To this suspension there are added 0.125% of 6-amino-penicillanic acid, 0.5% of α-phenoxypropionyl-thioglycolic acid and 0.1% of toluene. The reaction mixture is then adjusted to pH 6.5 with a concentrated sodium carbonate solution and stored at 37° C. for an hour. After this time, the batch contains 884 units of penicillin activity per cc. measured by a penicillin G standard in the plate test with *Bac. subtilis* ATCC 6633. This penicillin activity is caused by the α-methylphenoxyacetyl-6-amino-penicillanic acid formed in the enzymatic reaction.

Preparation of α-phenoxypropionyl-thioglycolic acid:
9.2 g. of thioglycolic acid are dissolved in 200 cc. of a 4.4% sodium hydroxide solution. 18.4 g. of α-phenoxypropionic acid chloride are added to this solution at 0–5° C. with good stirring within 30 minutes while introducing nitrogen. After further stirring at 20° C. for 2 hours, the product is acidified with hydrochloric acid. The separated oil is taken up with ether. After drying and evaporation of the ether, 22.9 g. of α-phenoxypropionyl-thioglycolic acid remain as a viscous oil which crystallises after prolonged standing. M.P. 52° C.

Example 2

To a bacterial suspension obtained as described in Example 1 there are added 0.025% of 6-amino-penicillanic acid, 0.5% of o-chloro-phenoxyacetyl-thioglycolic acid and 0.1% of toluene. The reaction mixture is then adjusted to pH 5.0 with hydrochloric acid and stored at 37° C. for an hour. After this time, the batch contains 324 units of penicillin activity per cc. measured by a penicillin G standard in the plate test with *Bac. subtilis* ATCC 6633. This penicillin activity is caused by the o-chloro-phenoxyacetyl-6-amino-penicillanic acid formed in the enzymatic reaction.

The o-chlorophenoxyacetyl-thioglycolic acid employed is prepared from o-chloroprenoxyacetyl chloride with thioglycolic acid similarly to phenoxypropionyl-thioglycolic acid (see Example 1). It forms colourless crystals of M.P. 120° C.

Example 3

To a bacterial suspension prepared as described in Example 1 there are added 0.125% of 6-aminopenicillanic acid, 0.5% of p-methoxyphenoxyacetyl-thioglycolic acid and 0.1% of toluene. The reaction mixture is then adjusted to pH 6.5 with a concentrated sodium carbonate solution and stored at 37° C. for an hour. After this time, the mixture contains 744 units of penicillin activity per cc. measured by a penicillin G standard in the plate test with *Bac. subtilis* ATCC 6633. This pencillin activity is caused by the p-methoxyphenoxyacetyl-6-amino-penicillanic acid formed in the enzymatic reaction.

The p-methoxyphenoxyacetyl-thioglycolic acid employed is prepared from p-methoxyphenoxyacetyl chloride with thioglycolic acid (see Example 1). Colourless crystals of M.P. 85° C.

Example 4

To a bacterial suspension obtained as described in Example 1 there are added 0.125% of 6-aminopenicillanic acid, 1.0% of 2,6-dichlorophenoxyacetyl-thioglycolic acid and 0.1% of toulene. The reaction mixture is then adjusted to pH 5.0 with hydrochloric acid and stored at 37° C. for an hour. After this time, the mixture contains 247 units of penicillin activity per cc. measured by a penicillin G standard in the plate test with *Bac. subtilis* ATCC 6633. This penicillin activity is caused by the 2,6-dichlorophenoxyacetyl - 6 - amino-penicillanic acid formed in the enzymatic reaction.

The 2,6-dichlorophenoxyacetyl-thioglycolic acid employed is prepared from 2,6-dichlorophenoxyacetyl chloride with thioglycolic acid (see Example 1). It forms colourless crystals of M.P. 60° C.

Example 5

To a bacterial suspension obtained as described in Example 1 there are added 0.125% of 6-amino-penicillanic acid, 1.0% of p-nitrophenoxyacetyl-thioglycolic acid and 0.1% of toluene. The reaction mixture is then adjusted to pH 5.0 with hydrochloric acid and stored at 37% C. for an hour. After this time, the batch contains 256 units of penicillin activity per cc. measured by a penicillin G standard in the plate test with *Bac. subtilis* ATCC 6633. This penicillin activity is caused by the p-nitrophenoxyacetyl - 6 - amino-penicillanic acid formed in the enzymatic reaction. The p-nitrophenoxyacetyl-thioglycolic acid is prepared from p-nitrophenoxyacetyl-chloride with thioglycolic acid (see Example 1). It forms a pale brown powder of M.P. 101° C.

Example 6

To a bacterial suspension as described in Example 1 there are added 0.025% of 6-aminopenicillanic acid, 0.5% of o-chloro-phenoxy acetic acid phenylester and 0.1% of toluene. The reaction mixture is then adjusted to a pH of 5.5 and stored at 37° C. for one hour. After this time, the mixture contains 5.9 units of penicillin activity per cc., measured by a penicillin G standard in the plate test with *Bac. subtilis* ATCC 6633. This penicillin activity is caused by the o-chloro-phenoxyacetyl-6-amino-penicillanic acid formed in the enzymatic reaction.

The o-chlorophenoxy-acetic-phenylester employed is prepared from o-chlorophenoxy acetic acid chloride with sodium phenoxide at 0–5° C. in tetrahydrofuran. After dissolving from ligroin it shows a melting point of 54–56° C.

Example 7

To a bacterial suspension obtained as described in Example 1 there are added 0.025% of 6-aminopenicillanic acid, 0.5% of o-chlorophenoxyacetyl glycolic acid and 0.1% of toluene. The reaction mixture is then adjusted to pH 6.5 and stored at 37° C. for 1 hour. After this time, the mixture contains 368 units of penicillin activity per cc. measured by a penicillin G standard in the plate test with *Bac. subtilis* ATCC 6633. This penicillin activity is caused by the o-chlorophenoxyacetyl-6-amino-penicillanic acid formed in the enzymatic reaction.

The o-chlorophenoxyacetyl glycolic acid of the formula $$2\text{-Cl}-C_6-H_4-O-CH_2-CO-O-CH_2-COOH$$

was received by adding an aqueous solution of the triethylamine salt of the glycolic acid with an excess of triethylamine and the same volume of tetrahydrofurane. 2-chlorophenoxy acetic acid chloride is dropped in at 0–5° C. Another method of preparation consists in the reaction of glycolic acid-tert-butylester with 2-chlorophenoxyaceto chloride in an alkaline medium. The 2-chlorophenoxy-aceto-glycolicacid-tert.-butyl ester is then thermally decomposed in isobutylene and 2-chlorophenoxyacetoglycolic acid. The acid melts after dissolving from benzene indefinitely at 107° C.

Example 8

To a bacterial suspension obtained as described in Example 1 there are added 0.025% of 6-aminopenicillanic acid, 0.5% of o-chlorophenoxyacetyl-thioglycolic acid amide and 0.1% of toluene. The reaction mixture is then adjusted to pH 5.5 and stored at 37° C. for 1 hour.

After this time, the mixture contains 53 units of penicillin activity per cc., measured by a penicillin G standard in the plate test with *Bac. subtilis* ATCC 6633. This penicillin activity is caused by the o-chlorophenoxyacetyl-6-aminopenicillanic acid formed in the enzymatic reaction.

The o-chlorophenoxyacetyl thioglycolic acid amide employed is prepared by reacting thioglycolic acid amide with 2-chlorophenoxyacetyl chloride in aqueous alkaline at 0–5° C. It shows a M.P. of 180°.

*Example 9*

To a bacterial suspension obtained as described in Example 1 there are added 0.025% of 6-aminopenicillanic acid, 0.5% of α-phenoxypropionyl-β-thiopropionic acid and 0.1% of toluene. The reaction mixture is then adjusted to pH 6.5 and stored at 37° C. for 1 hour.

After this time, the mixture contains 246 units of penicillin activity per cc., measured by penicillin G standard in the plate test with *Bac. subtilis* ATCC 6633. This penicillin activity is caused by the α-methylphenoxyacetyl-6-aminopenicillanic acid formed in the enzymatic reaction.

The α-phenoxypropionyl-β-thiopropionic acid of the formula

C₆H₅—O—CH—(CH₃)—CO—S—CH₂—CH₂—COOH employed is prepared by reacting the disodium salt of β-mercaptopropionic acid with α-phenoxypropionyl chloride in aqueous solution at 0–5° C. It forms after acidifying and extracting with ether a slight yellow resin.

*Example 10*

To a bacterial suspension obtained as described in Example 1 there are added 0.025% of 6-aminopenicillanic acid, 0.5% of diphenoxyacetyl glycolic acid and 0.1% of toluene. The reaction mixture is then adjusted to pH 5.0 and stored at 37° C. for 1 hour.

After this time, the mixture contains 122 units of penicillin activity per cc., measured by penicillin G standard in the plate test with *Bac. subtilis* ATCC 6633. This penicillin activity is caused by the diphenoxy-6-aminopenicillanic acid formed in the enzymatic reaction.

The diphenoxyacetyl glycolic acid of the formula

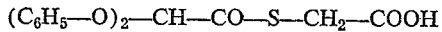

(C₆H₅—O)₂—CH—CO—S—CH₂—COOH is prepared by reacting diphenoxy acetic acid chloride with an aqueous solution of the disodium salt of thioglycolic acid. It shows after crystallization from acetyl acetate ligroin, M.P. 85°.

*Example 11*

160 liters (2% by volume) of corn steep water containing 0.2% of potassium phenyl acetate are adjusted with potassium hydroxide solution to pH 7.0 and heated at 120° for ½ hour. After cooling the solution is centrifuged and sterilized in a fermenter at 110° for 40 minutes. This nutrient solution is then inoculated with 400 cc. of an 18 hours' culture of *E. coli* ATCC 11105. The mixture is then aerated with 150 liters of air per minute at 150 rotations of the agitator and cultivated at 31° for 17 hours without pressure. During the whole growth period there are introduced into the culture 5 liters of carbon dioxide per minute by a tube which is separated from the airtube of the fermenter. Then the addition of air and carbon dioxide to the culture is finished and 0.05% of toluene and penicillin G are added until a concentration on 5000 units per cc. is reached. The mixture is then stored at 37 under slow stirring. It tries to decrease into the acidic region and is readjusted to pH 7.5 by repeated additions of 25% sodium carbonate solution. After a reaction time of 2½ hours penicillin G is splitted quantitative to 6-aminopenicillanic acid and phenyl acetic acid. Now there are added to the mixture 16 liters of a 10% solution of α-phenoxypropionyl thioglycolic acid neutralized before with sodium hydroxide solution. The reaction mixture is then maintained at pH 7.5 and 37° for further 2½ hours. After this time, the mixture contains 3800 units per cc. of α-phenoxyethyl penicillin.

We claim:

1. Process for the production of alpha-methylphenoxyacetyl-6-aminopenicillanic acid that comprises reacting 6-aminopenicillanic acid with alpha-phenoxypropionylthioglycolic acid in the presence of a culture of *Escherichia coli*.

2. Process for the production of o-chlorophenoxyacetyl-6-aminopenicillanic acid that comprises reacting 6-aminopenicillanic acid with o-chlorophenoxyacetylthioglycolic acid in the presence of a culture of *Escherichia coli*.

3. Process for the production of p-methoxyphenoxyacetyl-6-aminopenicillanic acid that comprises reacting 6-aminopenicillanic acid with p-methoxyphenoxyacetylthioglycolic acid in the presence of a culture of *Escherichia coli*.

4. Process for the production of 2,6-dichlorophenoxyacetyl-6-aminopenicillanic acid that comprises reacting 6-aminopenicillanic acid with 2,6-dichlorophenoxyacetylthioglycolic acid in the presence of a culture of *Escherichia coli*.

5. Process for the production of p-nitro-phenoxyacetyl-6-aminopenicillanic acid that comprises reacting 6-aminopenicillanic acid with p-nitrophenoxyacetylthioglycolic acid in the presence of a culture of *Escherichia coli*.

6. Process for the production of o-chlorophenoxyacetyl-6-aminopenicillanic acid that comprises reacting 6-aminopenicillanic acid with o-chlorophenoxyacetic acid phenylester in the presence of a culture of *Escherichia coli*.

7. Process for the production of o-chlorophenoxyacetyl-6-aminopenicillanic acid that comprises reacting 6-aminopenicillanic acid with o-chlorophenoxyglycolic acid in the presence of a culture of *Escherichia coil*.

8. Process for the production of alpha-methylphenoxyacetyl-6-aminopenicillanic acid that comprises reacting 6-aminopenicillanic acid with alpha-phenoxypropionyl-beta-thiopropionic acid in the presence of a culture of *Escherichia coli*.

9. Process for the production of diphenoxy-6-aminopenicillanic acid that comprises reacting 6-aminopenicillanic acid with diphenoxyacetylglycolic acid in the presence of a culture of *Escherichia coli*.

10. Process for the production of alpha-phenoxyethyl-6-aminopenicillanic acid that comprises reacting 6-aminopenicillanic acid with alpha-phenoxypropionylthioglycolic acid in the presence of a culture of *Escherichia coli*.

11. Process for the production of o-chlorophenoxyacetyl-6-aminopenicillanic acid that comprises reacting 6-aminopenicillanic acid with o-chlorophenoxyacetylthioglycolic acid amide in the presence of a culture of *Escherichia coli*.

12. Process for the production of a 6-acylaminopenicillanic acid that comprises:
reacting 6-aminopenicillanic acid with a compound selected from the group consisting of esters, amides and salts of hydroxy- and mercaptocarboxylic acid derivatives containing an acyl radical of the formula:

R—(X)ₙ—CH—R'—CO— wherein R is a member selected from the group consisting of lower alkyl radicals containing from 1 to 7 carbon atoms, and phenyl radicals; R' is a member selected from the group consisting of hydrogen, methyl and phenoxy; X is a member selected from the group consisting of oxygen and sulfur; and n is an integer of from 0 to 1, inclusive;

in the presence of a penicillin-splitting bacterial enzyme capable of linking the 6-amino group of said 6-aminopenicillanic acid with said acyl radical to yield 6-acylaminopenicillanic acid;

and thereafter recovering the 6-acylaminopenicillanic acid from the reaction mixture;

said penicillin-splitting bacterial enzyme being selected from the group capable of inactivating penicillin G by at least 20 percent within 24 hours to yield a solution in which said inactivated penicillin G can be at least partially reactivated by the addition of phenylacetyl chloride thereto.

References Cited in the file of this patent

UNITED STATES PATENTS

| | | |
|---|---|---|
| 2,422,777 | Eisenberg et al. | June 24, 1947 |
| 2,475,920 | Smith et al. | July 12, 1949 |
| 2,934,540 | Sheehan | Apr. 26, 1960 |
| 2,941,995 | Doyle et al. | June 21, 1960 |

UNITED STATES PATENT OFFICE
CERTIFICATE OF CORRECTION

Patent No. 3,079,306                              February 26, 1963

Hans Albert Offe et al.

It is hereby certified that error appears in the above numbered patent requiring correction and that the said Letters Patent should read as corrected below.

Column 6, line 67, for "$R-(X)_n-CH-R'-CO-$" read -- $R-(X)_n-\underset{\underset{R'}{|}}{C}H-CO-$ --.

Signed and sealed this 21st day of April 1964.

(SEAL)
Attest:

ERNEST W. SWIDER
Attesting Officer

EDWARD J. BRENNER
Commissioner of Patents